United States Patent
Askestad

(10) Patent No.: US 10,422,456 B2
(45) Date of Patent: Sep. 24, 2019

(54) TUBE CONNECTOR FOR DETACHABLY CONNECTING TWO CONNECTOR PARTS FOR GAS-TIGHT CONNECTING OF RISER TUBES TO VESSELS

(71) Applicant: APL TECHNOLOGY AS, Kolbjornsvik (NO)

(72) Inventor: Sigmund Askestad, Tvedestrand (NO)

(73) Assignee: APL TECHNOLOGY AS, Kolbjørnsvik (NO)

( * ) Notice: Subject to any disclaimer, the term of this patent is extended or adjusted under 35 U.S.C. 154(b) by 589 days.

(21) Appl. No.: 14/649,626

(22) PCT Filed: Dec. 9, 2013

(86) PCT No.: PCT/NO2013/000055
§ 371 (c)(1),
(2) Date: Jun. 4, 2015

(87) PCT Pub. No.: WO2014/088419
PCT Pub. Date: Jun. 12, 2014

(65) Prior Publication Data
US 2016/0186905 A1  Jun. 30, 2016

(30) Foreign Application Priority Data
Dec. 7, 2012  (NO) .................................. 20121491

(51) Int. Cl.
*F16L 23/18* (2006.01)
*F16L 23/08* (2006.01)

(52) U.S. Cl.
CPC .............. *F16L 23/18* (2013.01); *F16L 23/08* (2013.01)

(58) Field of Classification Search
USPC ........................................................ 285/412
See application file for complete search history.

(56) References Cited

U.S. PATENT DOCUMENTS

| | | | |
|---|---|---|---|
| 1,873,855 A * | 8/1932 | Wilson | F16L 23/20 220/327 |
| 3,749,426 A * | 7/1973 | Tillman, III | F16L 23/20 277/607 |

(Continued)

FOREIGN PATENT DOCUMENTS

| | | |
|---|---|---|
| CA | 2130102 A1 * | 9/1993 |
| GB | 2 103 482 A | 2/1983 |

(Continued)

OTHER PUBLICATIONS

Nordic Patent Institute; International Search Report PCT/NO2013/000055 (dated Feb. 20, 2014).

(Continued)

*Primary Examiner* — Aaron M Dunwoody
(74) *Attorney, Agent, or Firm* — Leydig Voit & Mayer

(57) ABSTRACT

A hollow tube connector is used to make detachable fluid-tight connection of two connector parts. The tube connector includes a first connector part, wherein a first of its two axial ends is configured to connect to a pipeline on a vessel, and a second connector part, wherein a first of its two axial ends is configured to connect to a pipeline on an STP-buoy. The coupling surfaces of the second axial ends include a non-crossing groove circumferentially around the contact surfaces, and a groove located on one of the contact surfaces and having a mirror-imaged groove located on the other contact surface. The two opposite grooves form an encompassing cavity upon contact of the contact surfaces. At least one of the contact surfaces is tapered relative to an axis perpendicularly to a center axis and forms a pre-tensioned abutment which increases the resistance to relative motions between the contact surfaces.

6 Claims, 13 Drawing Sheets

(56) References Cited

U.S. PATENT DOCUMENTS

Figure 1C:
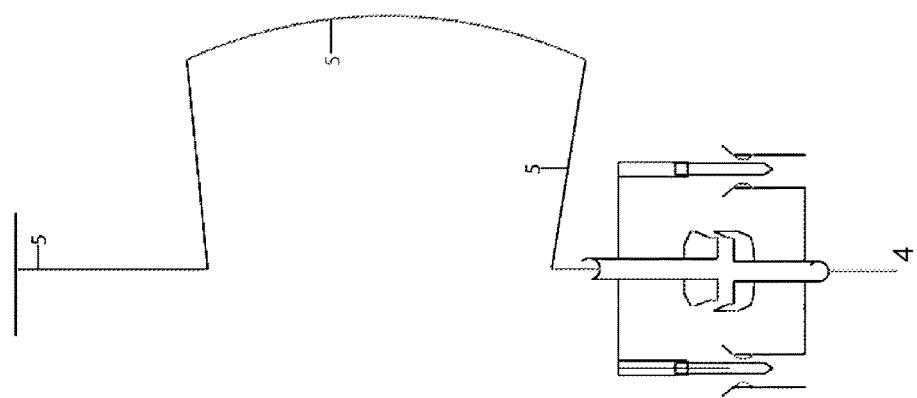

| | | | | |
|---|---|---|---|---|
| 3,794,361 | A * | 2/1974 | Westberg | F16J 15/062 285/336 |
| 4,272,109 | A * | 6/1981 | Ahlstone | E21B 17/085 277/609 |
| 4,428,603 | A * | 1/1984 | Davlin | F16L 23/16 285/3 |
| 4,441,725 | A * | 4/1984 | Bailey | F16L 23/08 277/614 |
| 4,550,921 | A * | 11/1985 | Smith | F16L 23/20 277/614 |
| 5,090,871 | A | 2/1992 | Story et al. | |
| 5,197,766 | A * | 3/1993 | Glover | F16L 23/167 210/165 |
| 5,431,417 | A * | 7/1995 | Dahlgren | F16L 23/20 277/614 |
| 5,868,524 | A | 2/1999 | Martin | |
| 6,394,507 | B1 * | 5/2002 | Baker | F16L 23/024 285/334.1 |
| 8,393,649 | B2 * | 3/2013 | Kitaguchi | F16L 23/167 285/12 |
| 2006/0082135 | A1 | 4/2006 | Askestad | |
| 2007/0013188 | A1 * | 1/2007 | Dallas | F16L 17/08 285/354 |

FOREIGN PATENT DOCUMENTS

| | | |
|---|---|---|
| NO | 163148 B | 1/1983 |
| NO | 320661 B1 | 11/2003 |
| NO | 333634 B1 | 12/2012 |
| WO | WO 93/17268 A1 | 9/1993 |

OTHER PUBLICATIONS

Norwegian Search Report; Norwegian Patent Application No. NO 20121491 (dated Jun. 3, 2013).

Aanesland, V., et al., "Basic Features of the Submerged Turret Production (STP) Concept," *Offshore Technology Conference* (1997).

Norsok Standard, "Compact flanged connections," *Standards Norway*, Rev. 1 (2003).

* cited by examiner

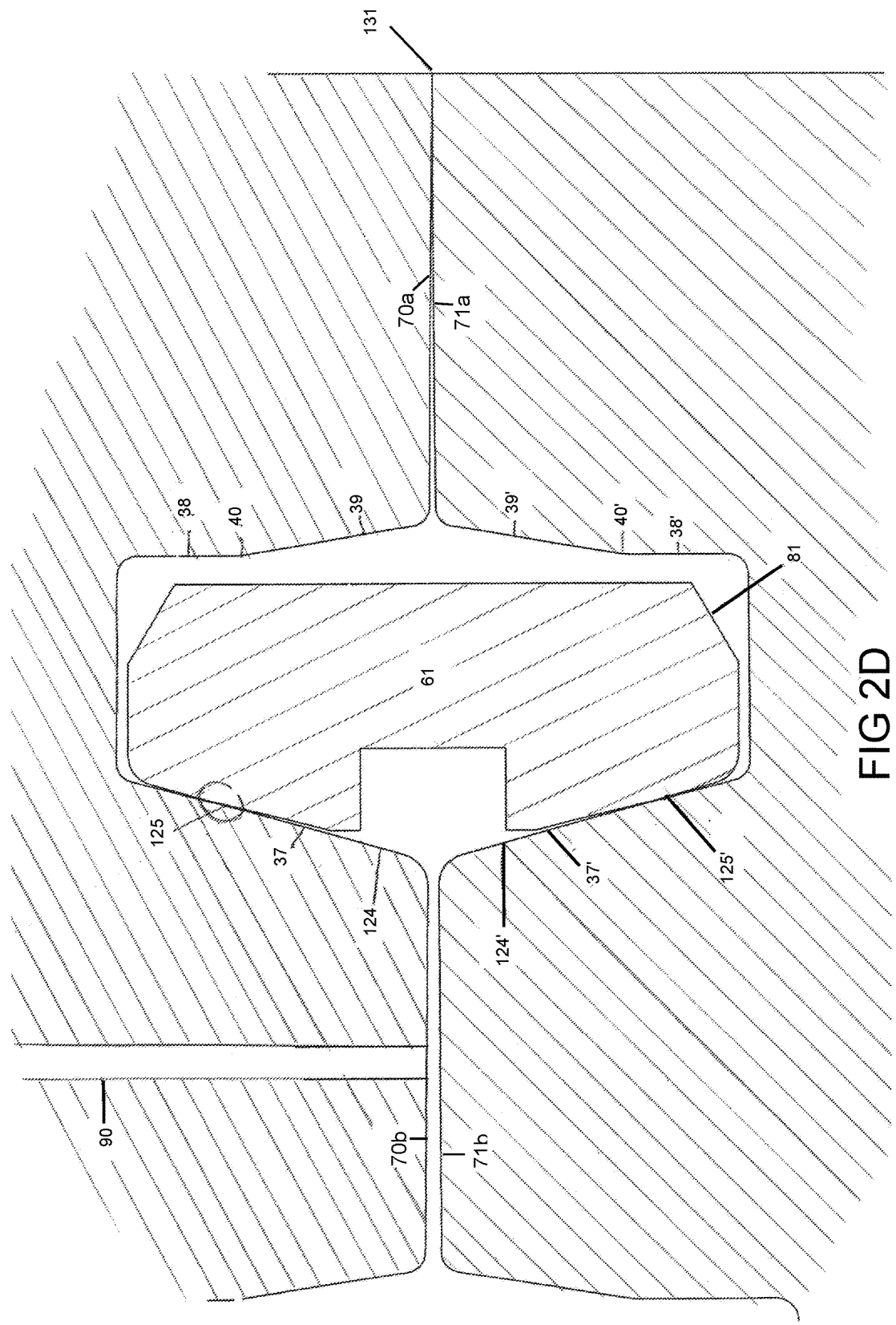

TUBE CONNECTOR FOR DETACHABLY CONNECTING TWO CONNECTOR PARTS FOR GAS-TIGHT CONNECTING OF RISER TUBES TO VESSELS

CROSS-REFERENCE TO RELATED APPLICATIONS

This patent application is a U.S. national stage application of PCT Patent Application No. PCT/NO2013/000055, filed Dec. 9, 2013, published as WIPO publication No. WO 2014/088419, which claims priority to Norwegian Patent Application No. NO 20120001491, filed December 2012. PCT Patent Application No. PCT/NO2013/000055 and Norwegian Patent Application No. NO 20120001491 are incorporated by reference.

TECHNICAL FIELD

The present invention relates to a gas sealing arrangement suited for mounting and unmounting of production tubing of oil and gas.

BACKGROUND OF THE INVENTION

Nowadays, there exist a large number of solutions for gas sealing arrangements in connection with oil and gas production. It is important that processed chemicals, solvents and other fluids are kept as pure as possible during all phases of handling and supply, since any contact with contamination will increase the risk of faults in the produced product. In systems which handle fluids under high pressure, each connection link represents a risk of leakage or penetrating contamination. A measure against such unwanted events can be the application of a combination of solutions which as a whole reduce the risk. An example for such a combined solution within production tubing of oil and gas is given in U.S. Pat. No. 5,090,871 A, which discloses a flange based coupling with dual o-ring seals and clamping device, and also a test port for detection of leakage by use of a sensor device. U.S. Pat. No. 163,148 B describes a similar sealing system which restricts passage of oil, gas, steam, smoke and flames.

However none of these publications mentions active use of coupling flanges which are adapted according to standard compact flange coupling (CFC) and which are shaped tapered in order to achieve a pre-tensioning pressure between the two connection parts. Use of such coupling flanges has shown to significantly lower the risk for said leakage or penetrating contamination, and the combination CFC, clamping device and sealing ring(s) makes the present invention particularly suited for fluids under high pressure.

Said references do not mention either active use of distinct geometrical shapes on the clamping surfaces in order to achieve more efficient, safer and simpler connecting of connection parts.

It is very important for such a connector that the external loads do not go through the seals. By application of for example usual ASME-flanges a considerable part of the external load runs through the seals, and thus can normally not be used to take external loads.

In connectors of said type, there occur even strains in the sealing area in that the two connector parts move away from each other as a consequence of elasticity in flanges and clamping arrangements. By having pre-tensioned the flanges in two surfaces close to the seals, we achieve a relief of this pressure instead of a strain in this area.

BRIEF SUMMARY OF THE INVENTION

The objectives/needs are achieved by the present invention by a hollow tube connector for detachable connecting of two connector parts having the characterizing features indicated in claim 1. Further preferred embodiments of the invention are disclosed in the remaining dependant claims.

Specifically, the invention comprises a hollow tube connector for detachably coupling of two connector parts, comprising two main parts:
  a first connector part, where one of its two axial ends is adapted to connect to at least one pipeline on a vessel, and
  a second connector part, where one of its two axial ends is adapted to connect to at least a pipeline located on an STP-buoy.

In use the tube connector comprises furthermore a suitable clamping device which entirely or partially encloses the two remaining opposite ends of said connector parts such that said first and second connector part are clamped together to a fluid-tight or substantially fluid-tight connection.

The tube connector is distinctive in that the coupling faces of the remaining axial ends associated with the first and second connector part comprise at least one non-crossing groove running around the circumference of the contact faces, where the at least one groove located on the at least one contact face has an opposite, mirror-imaged groove located on the other contact face, such that the two opposite grooves form an encompassing cavity on contact of the contact faces. One or more of the at least one grooves are adapted for receiving/arrangement of at least one sealing ring prior to said sealing connection of said first and second connector parts on contact of the contact faces. The remaining parts of the coupling faces of the axial ends are preferably shaped according to standard compact flange couplings (CFC), where the combination of said shape of the coupling faces, said cavity/cavities with inserted sealing ring(s) and said clamping device constitute a fluid-tight connecting of the two connector parts after contact.

The at least one sealing ring being used is preferably of type standard IX sealing ring, but may also be other suitable type such as standard HX sealing ring, standard sealing ring used in API-flanges or standard sealing ring used in ASME-flanges. In case of use of multiple grooves, two or more different sealing ring types may be combined.

The tube connector is further distinctive in that at least one of the contact face areas are tapered with respect to the axis or the surface oriented perpendicularly based on the axial axis, such that abutment with pre-tension is formed which restricts or limits relative motion in between the contact faces. One or more of the tapered shapes have beneficially an angle of inclination which after contact forms a wedge with the sharp end oriented in the direction towards the center axis of the tube connector.

Coupling faces here means the surfaces of the opposing axial ends or connector part extensions of the connector parts which entirely or close-to-entirely touch each other subsequent the contact or connection being done. Furthermore, contact face areas are defined as those areas on a connection face which radially adjoin said at least one groove.

Preferably, the tube connector comprises at least two non-crossing grooves going around the circumference of the contact faces, where each of the at least two grooves located on one of the contact faces has an opposite, mirror-imaged groove located on the other contact face, for thus forming an encompassing cavity on contact or close to contact of the contact faces. In this implementation, the tapered angle beneficially may be different on at least one contact face areas compared to the remaining contact face areas.

When CFC is used in connection with coupling two flanges/connector parts at oil and gas production, the shape of the contact faces should often be modified somewhat based on current flange dimensions and flange stiffness, etc. For example a stiff flange must have a relatively smaller wedge and angle of inclination in order to ensure a sufficient pressure between its inner and outer contact faces in mounted state. An appropriate angle must at any time be calculated to be able to achieve the same or close to the same effect as compact flanges, for example produced according to Norsok standard, ref Norsok Standard, L-005, Edition 2, May 2006. In particular when using two or more sealing rings the connector parts have relatively high diameter, something which causes an entirely different stiffness than standard flange with corresponding tube dimension and pressure. For example, the use of standard sealing rings would cause that the outer seal would correspond to transition to standard seal for next tubing size within the field. Furthermore, the current flange should have extra material in order to perform together with the clamping device, something which results into that they obtain both larger diameter, and also become thicker at same tubing diameter and pressure, compared to standard CFC-connection.

In case of standard flange coupling (CFC), such as with Norsok standard, suitable bolts are often used in order to achieve sufficient sealing. In the present invention, such bolts or similar are not required since the application of a suitable clamping device is more beneficial for a fast and "self-aligning" connection, which then ensures entirely or essentially the desired liquid/gas tight connection between the two connector parts. For further improving the sealing between the connector parts, the geometry of the clamping device is adapted such that an efficient clamping effect is achieved along the entire circumference of the outer and inner contact faces of the finally connected connector parts. This is achieved by a clamping device comprising at least two parts which together enclose entirely or close to entirely the tubing connector part extensions subsequent to contact, wherein the inner faces of the device are so designed that they create the desired radial and axial pressure onto the connector parts. Furthermore, the contact faces of the clamping device, that is, the surfaces where the parts of the device meet, should be adapted such that maximum contact is obtained at full pre-tensioning, at the same time as risk of displacement of the clamping device is minimized during the pre-tensioning process itself.

These results can be accomplished in that the inner surfaces of the device, which form an aperture for partially receiving the tubing connector part extensions subsequent to contact, have a shape where the width of the aperture in the axial direction of the connector is somewhat smaller at the mutual contact surfaces of the clamping device than those points which are located farthest off said contact surfaces. Additionally, the geometry about the contact surfaces of the clamping device should be adapted such, that a parallel or near parallel contact is achieved when full pre-tensioning about the connector parts is achieved.

Furthermore, the areas around the contact surfaces of the clamping device should be prepared to allow insertion of at least one bolt which takes care of the pre-tensioning. In such an embodiment, it would be beneficial that the surfaces which abut the respective contact faces at the bolt(s) are so designed, that at least one bolt exerts a symmetrical pressure against the surface of the device when full pre-tensioning is obtained.

Furthermore, it would be beneficial if the tube connector also comprises at least one test channel in the form of an open channel with one end located at the border face between the two contact faces in the area off at least one of the at least one cavity, with respect to the center axis of the tube connector subsequent to contact, and the second end located on the outer surface of the tube connector. In case of at least two cavities, one of the ends should subsequent to contact reside between two of the cavities. The at least one test channel allows consequently pressure testing by injection of at least one testing gas, for example inert gas. Outer surface means herein any surface on the tube connector excluding that part which faces the fluid stream channel(s). Said at least one test channel may beneficially be directed axially with respect to the tube connector (in parallel with the center axis), and penetrating the first or second connector part.

In another embodiment of the present invention, the tube connector comprises two or more test channels, where at least one of the at least two may be closed at one end. The purpose with the one or the plurality of closed test channels is to simplify bleeding off and insertion of at least one second channel if the main channel(s) should fail due to for example undesired clogging of the entry. The purpose of the length of the channels oriented up and out of the tube connector is to go clear of the clamps.

In a further beneficial embodiment of the present invention, one or more of the grooves in the coupling surfaces of the connector are angled differently in relation to standard angle for the sealing grooves, where the deviation in relation to the standard would be according to the strain of the connector relatively to the angle on the lower tapered contact face, measured from the center axis of the connector. Moreover, the outer or/and inner groove walls may for example be formed with additional angles of inclination in combination with protrusions/knuckles, preferably located substantially half-way down into the depth of the groove or below the sealing surface between the seal/sealing ring and the groove surface. Such a configuration allows for necessary space/displacement for the sealing ring(s) during the contact making of the at least two coupling faces itself in case of a certain angular anomaly. Also the diameter of one or more of the sealing grooves may differ from standard groove dimension since said axial ends may have different stiffness compared to conventional flanges. Consequently, the sealing grooves may differ both with respect to angle and size of circumference. Correct size of angles and circumference are determined usually by standard element calculations.

In order to simplify sufficient center alignment of the two connector parts at/during contact making, and in order to avoid extensive radial movements on contact making/detaching, the inventive tube connector may beneficially employ at least one suitable control device, for example one or several of the control devices described in Norwegian patent application NO20110784 and which is incorporated herein by reference.

BRIEF DESCRIPTION OF THE SEVERAL
VIEWS OF THE DRAWING(S)

The present invention will be understood more easily with support from the corresponding figures.

Figure 1B:
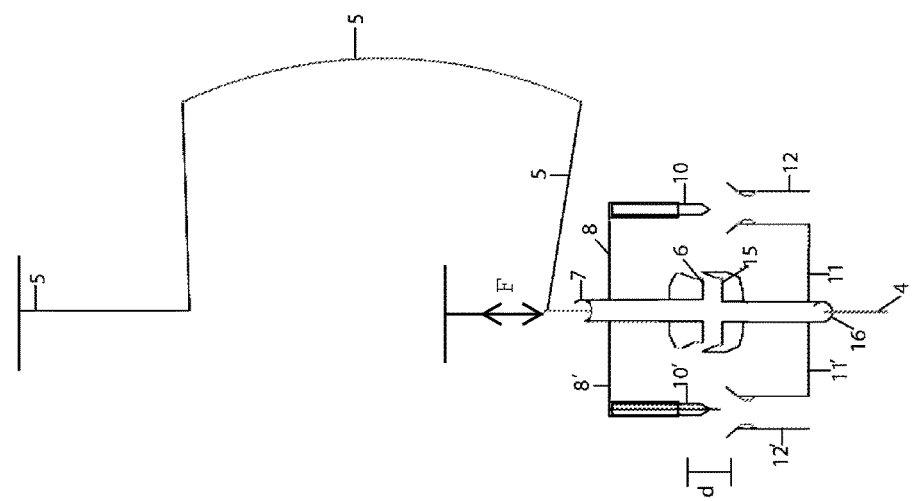
Figure 1A:
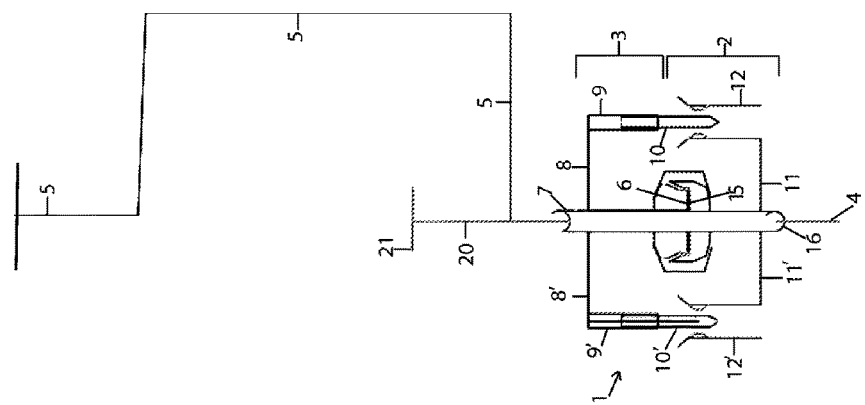

FIGS. 1A-C show principal drawings of the hollow tube connector and the corresponding pipelines to be connected according to the present invention, where FIG. 1A illustrates the two connector parts connected by means of a suitable telescopic guiding system, FIG. 1B illustrates the two connector parts and the telescopic guiding system completely detached and FIG. 1C illustrates the tube connector partly connected.

Figure 2A:
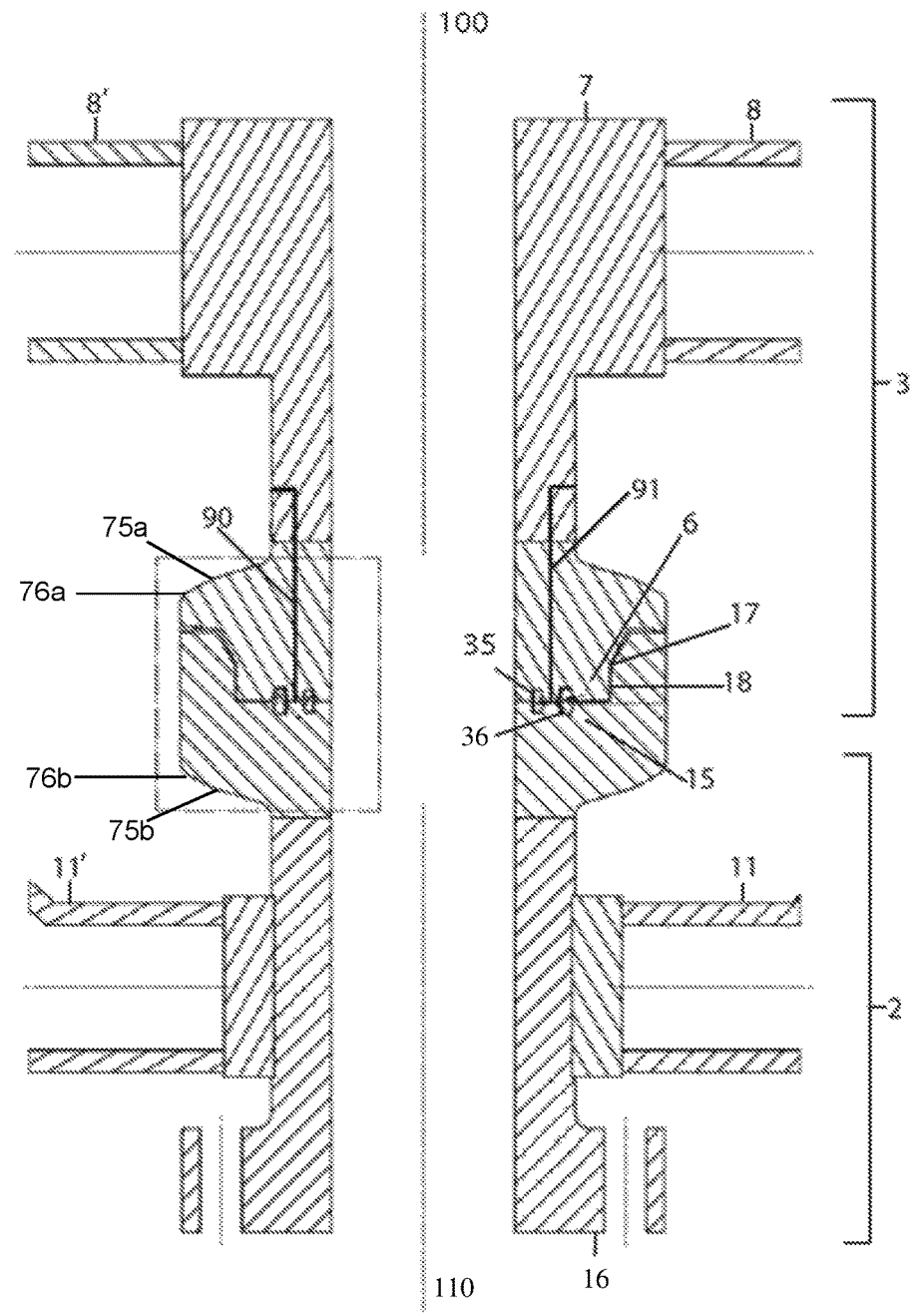
Figure 2B:
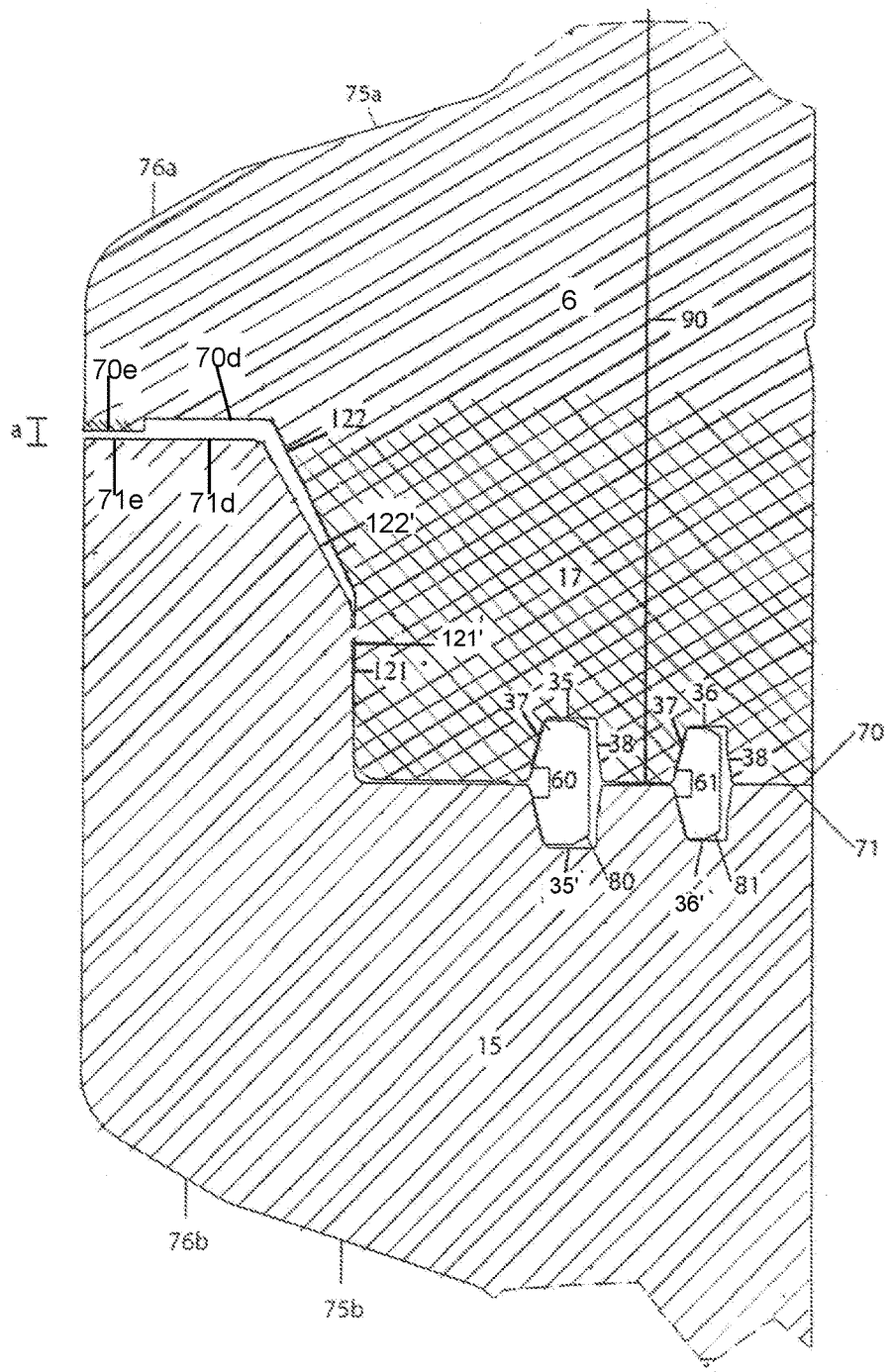
Figure 2C:
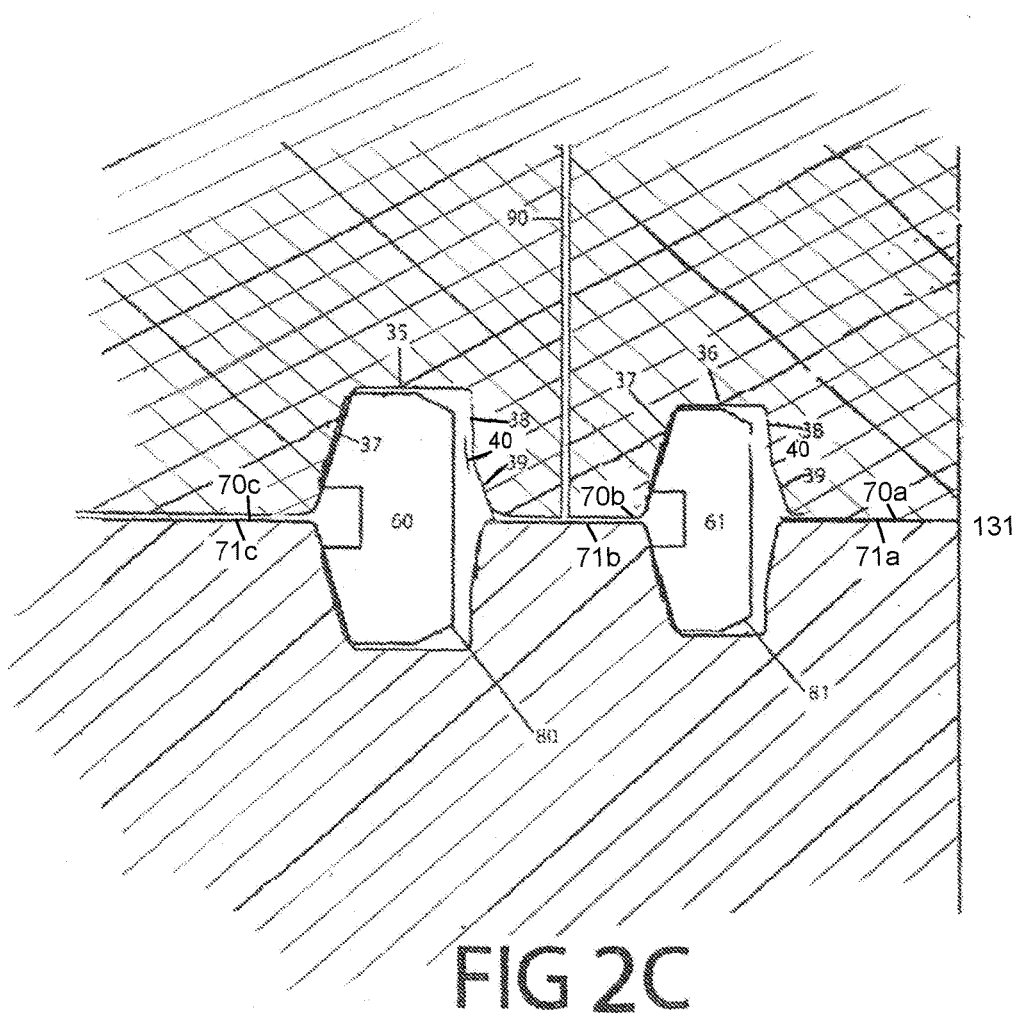

FIGS. 2A-D show detail drawings of the connector parts only in the tube connector wherein most of the guiding system and the entire clamping device are removed for the sake of understanding. FIG. 2A shows a cross section of the connector parts inside the hollow tube connector, FIG. 2B shows a detail drawing of that portion of FIG. 2A which is enclosed by dashed frame in FIG. 2A, and FIGS. 2C and 2D show in further detail the shape of the cavity(cavities) which enclose the sealing ring(s).

Figure 3A:
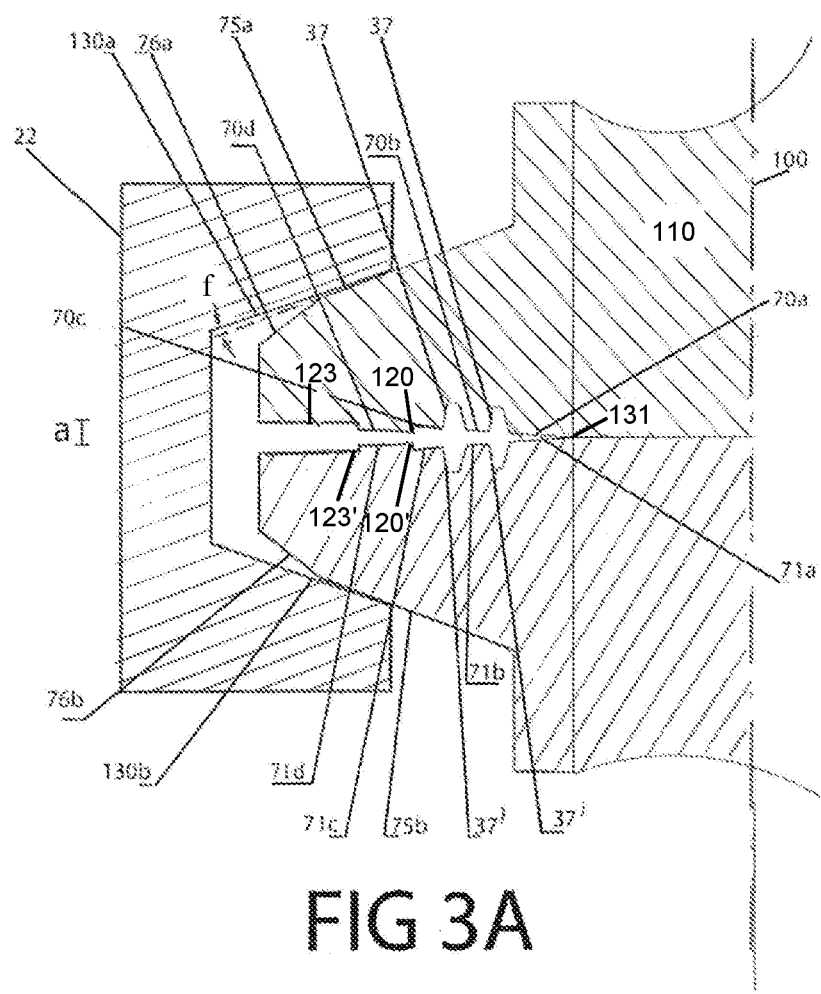
Figure 3B:
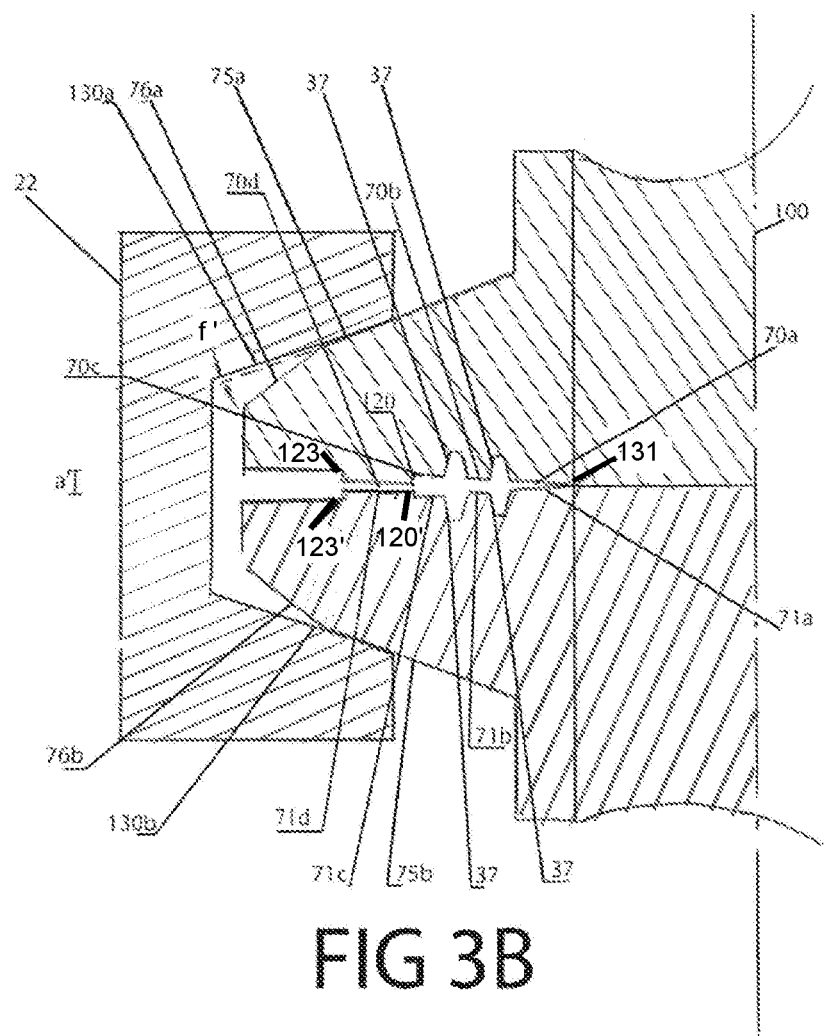
Figure 3C:
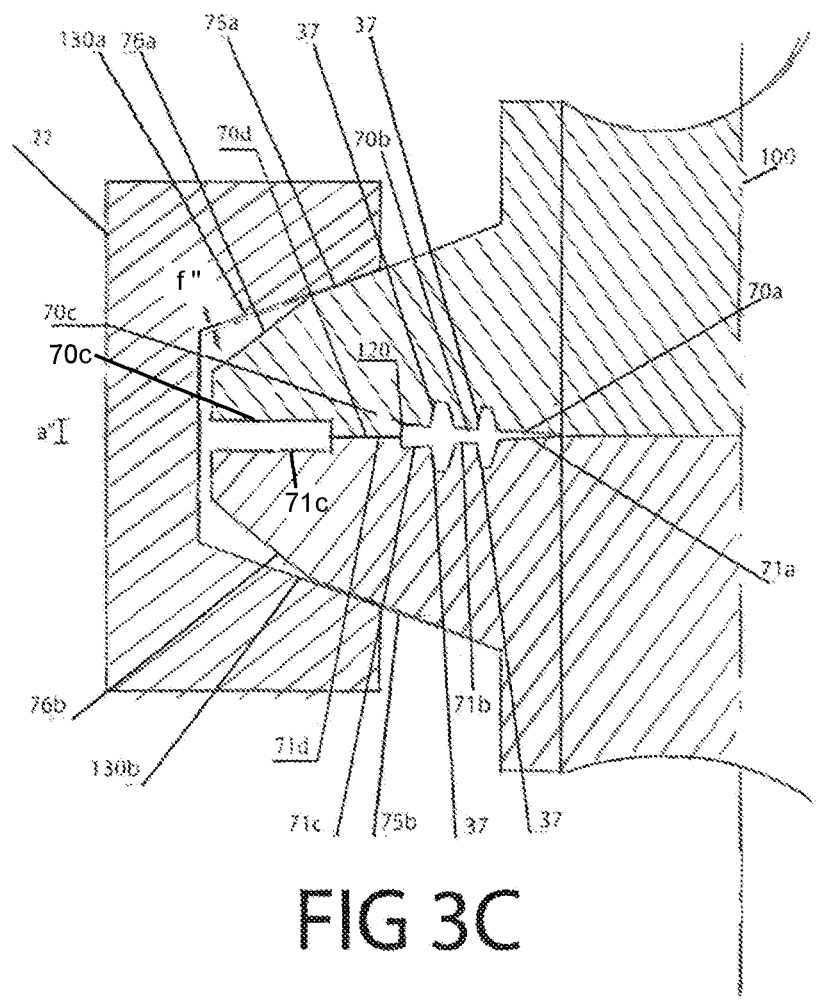

FIGS. 3A-C show detail drawings of partially or entirely connected connector parts at various positions on the clamping device. FIG. 3A shows a cross sectional drawing of initial assembly of the clamping device/connection parts where the coupling surfaces are in contact only in proximity of the hollow connector tube, FIG. 3B shows the situation in FIG. 3A where the clamping device is passed through up to the center axis of the tube connector, and FIG. 3C shows the clamping device being completely inserted where outer and inner contact surfaces on the two connection parts make contact.

Figure 4A:
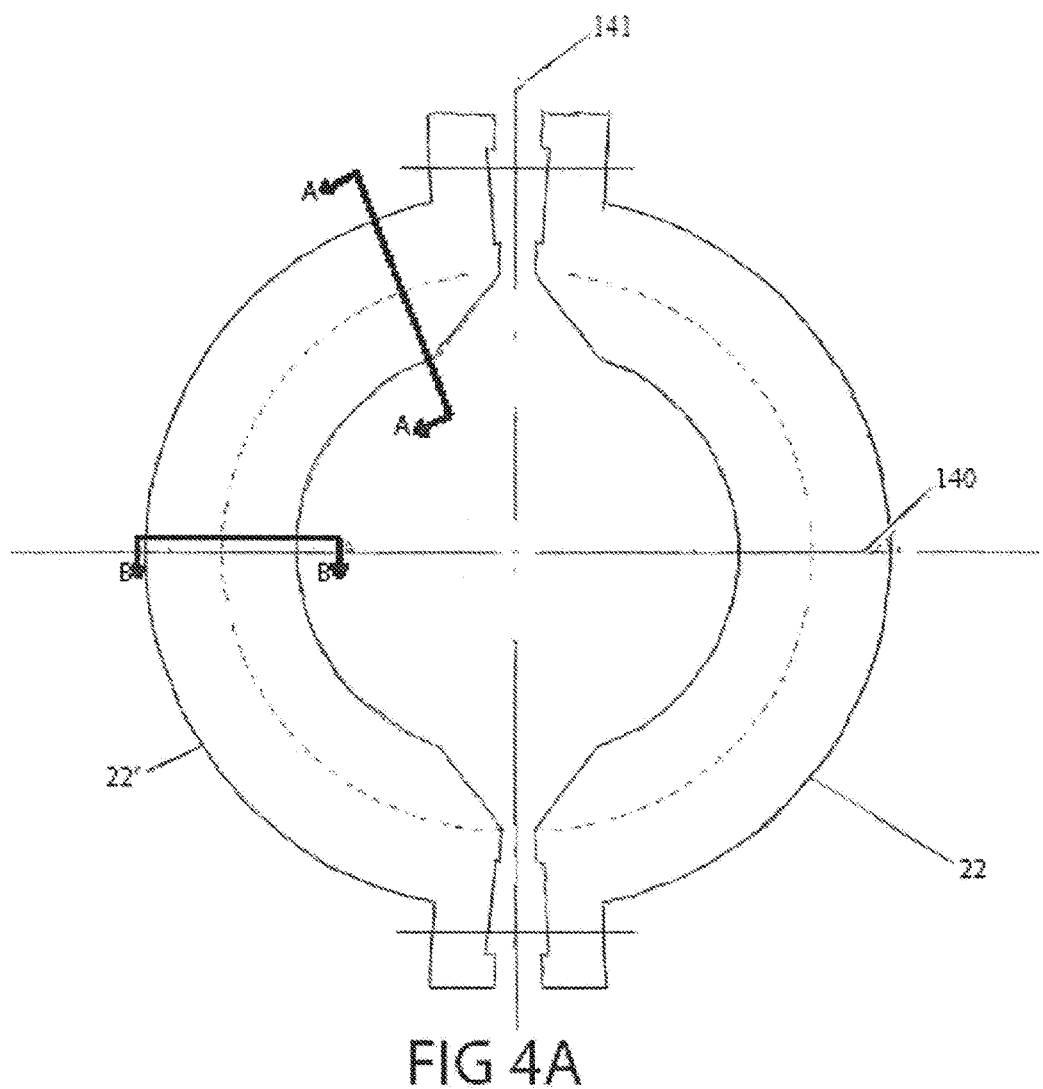
Figures 4B, 4C:
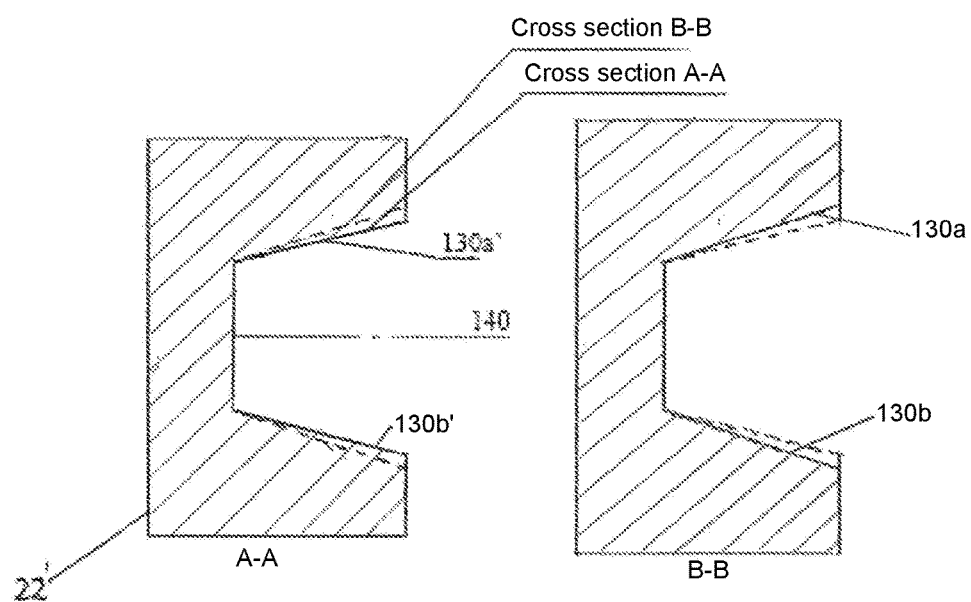

FIGS. 4A-C show detail drawings of the geometrical shape of the clamping device seen in top view (FIG. 4A), and as cross sectional drawings for cut A-A (FIG. 4B) and cut B-B (FIG. 4C) respectively.

Figure 5A:
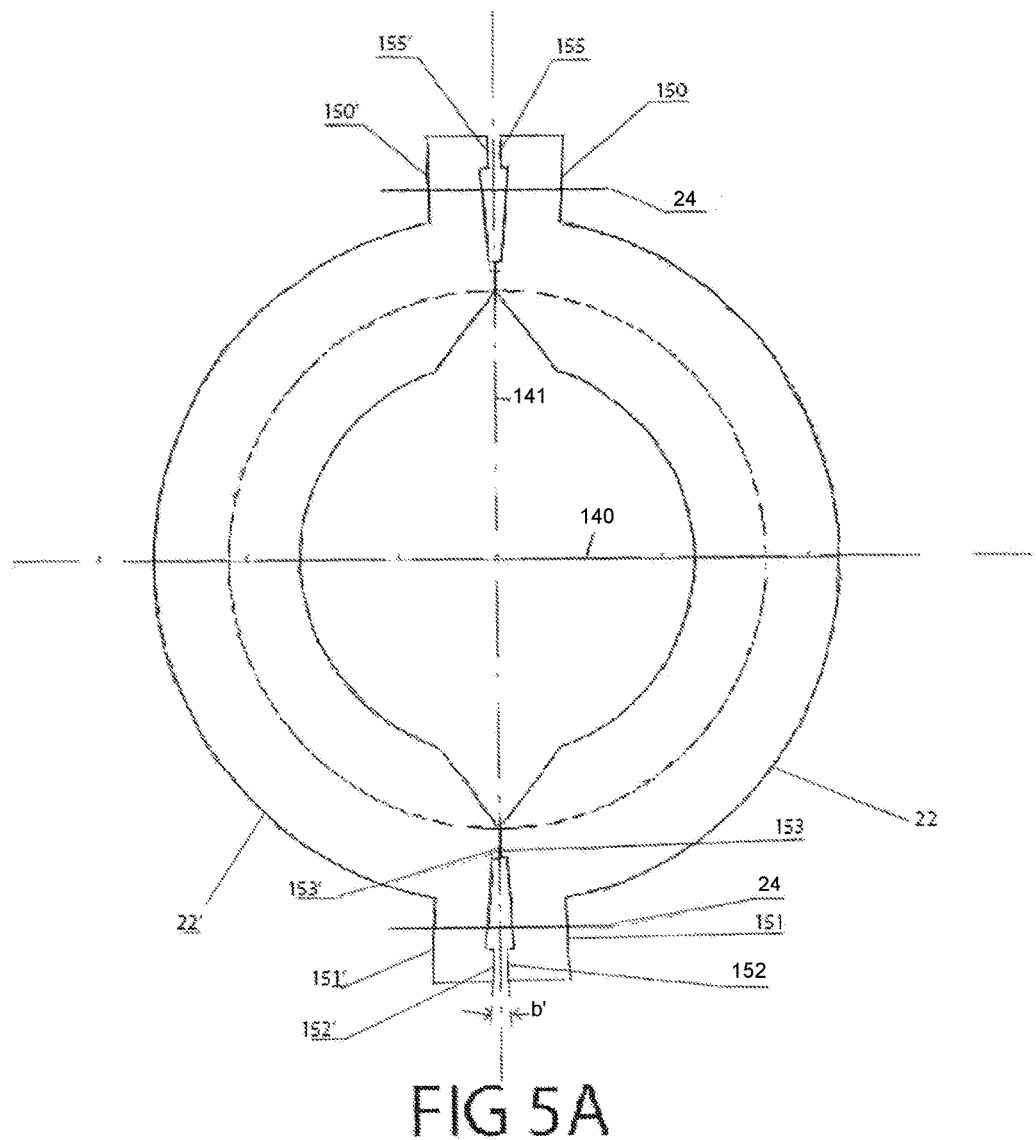
Figure 5B:
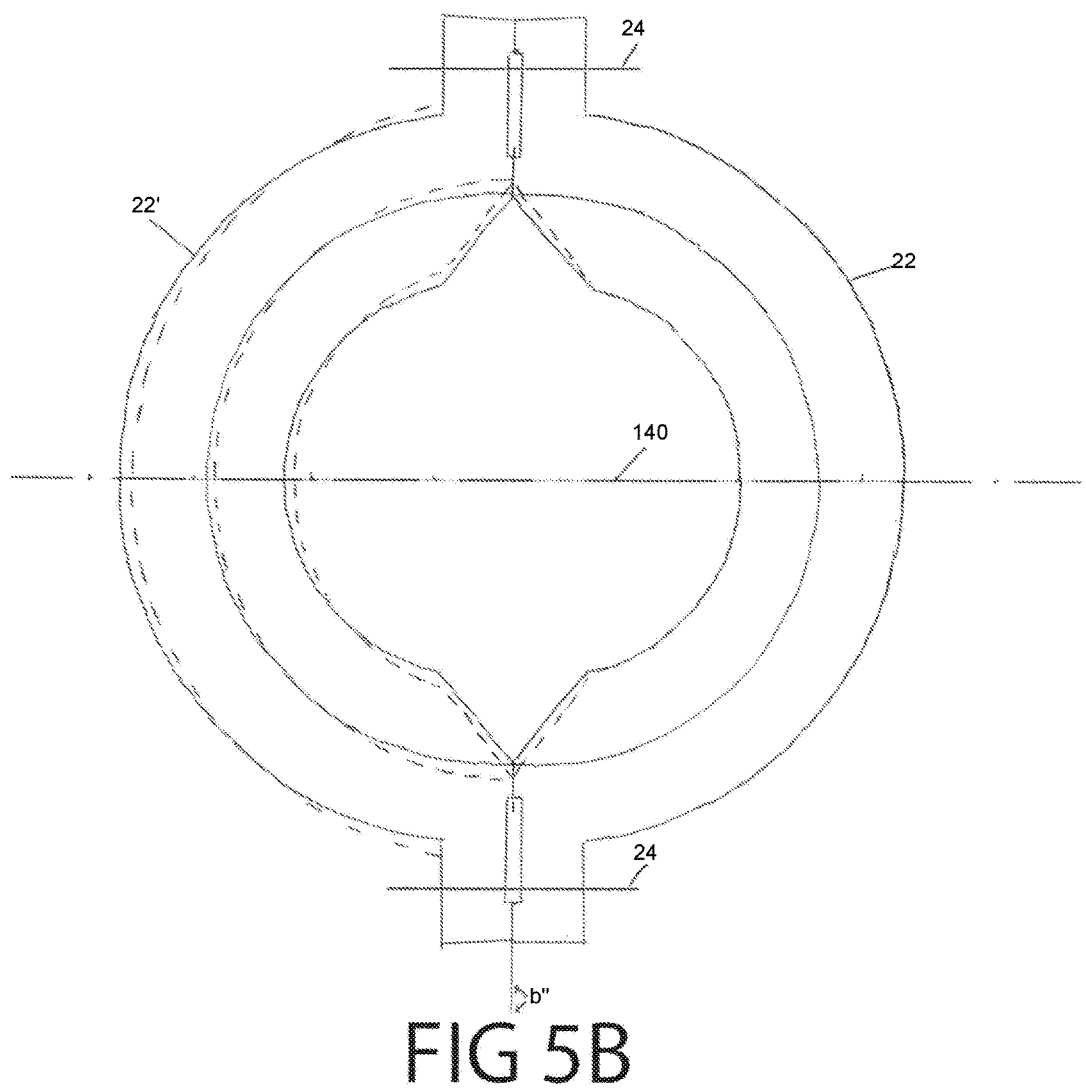

FIG. 5A-B show detail drawings of the geometrical shape of the clamping device seen in top view in partly connected (FIG. 5A) and completely connected (FIG. 5B) position respectively. FIG. 5B shows partly connected state in FIG. 5A overlaid with dashed line for easier comparison.

Figure 6:
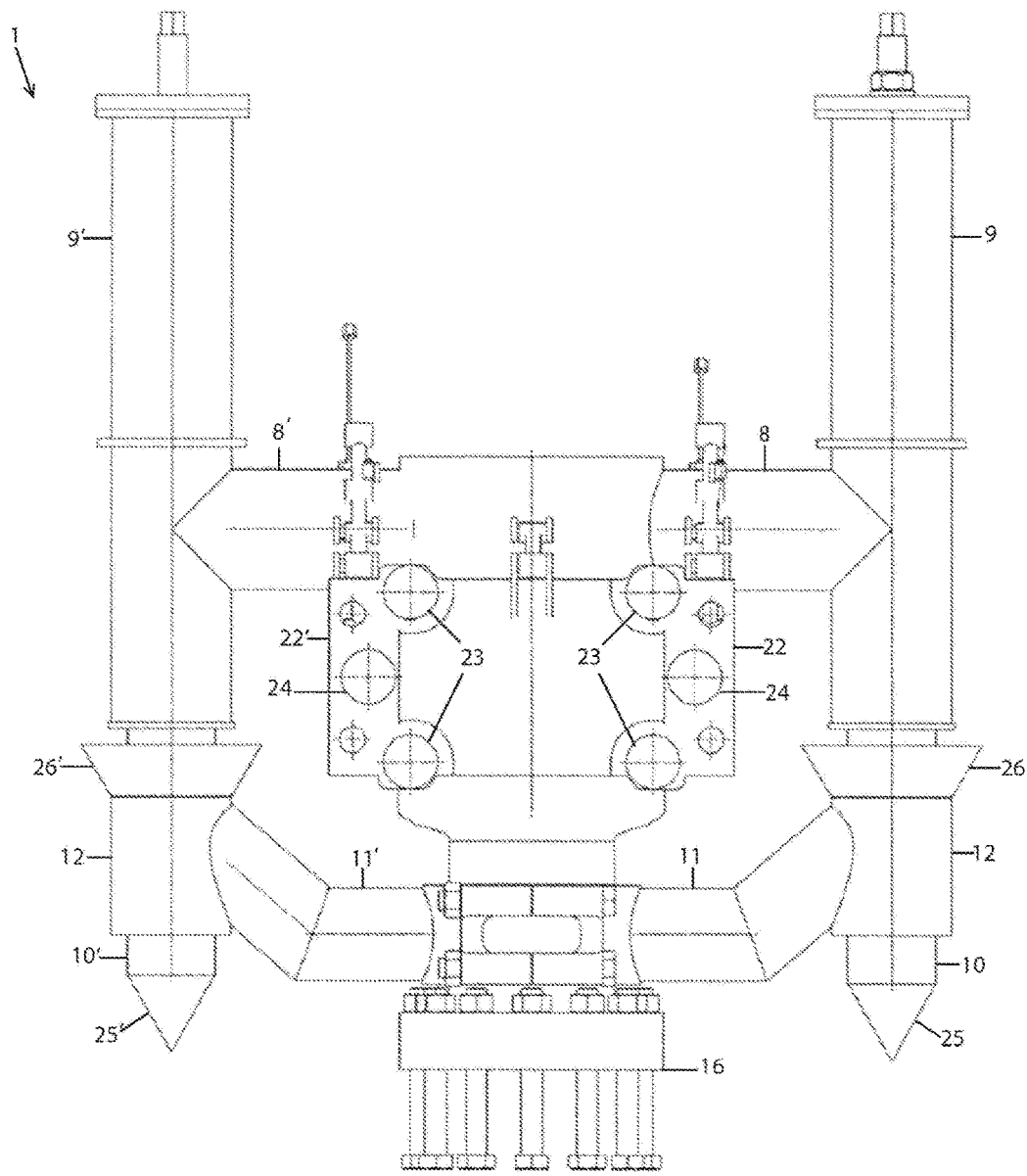

FIG. 6 shows a sectional view of the assembly connector parts, clamping device and control device.

DETAILED DESCRIPTION OF THE INVENTION

The purpose of the present invention is to provide a tube connector with a connection system, for secure, practical connection and controllable sealing. The connector (seals) should be less sensitive for external loads and changes in internal pressure in that the connection system (the sealing system) is affected in little or no degree by external strain and/or internal pressure caused by movements/forces. Additionally, a connector with such properties would be less sensitive for material fatigue. The sealing surfaces between the sealing rings which are located in the grooves will be held stable or close to stable, which is important for the sealing to be tight. As a consequence, this gives also less wear between sealing ring(s) and grooves, and consequently lower risk of leakage. Such a connection system is sought to be obtained by utilizing a combination of sealing devices and special geometrical shapes of the flanges and contact faces. The latter may also solve the need for a more efficient clamping/pre-tensioning of said contact faces. Such a pre-tensioning could solve the deformation problem, since the pre-tensioning causes a relief of the pressure instead of strain in this area.

Additionally, in operation the sealing system should permit good, simple and low-cost user inspection that is with minimum need for complex and cost-increasing elements such as introduction of fluid sensitive probes. Instead of the more traditional pressure testing of the entire or extensive parts of the piping system, it is consequently a further objective of the connector to be allow pressure-testing the clamp-based connection system with gas in a small volume. This is considered favorable since the coupling is to be used for repeated connecting and disconnecting.

Another objective is to be able to achieve a combination of the advantages compact flanges provide with clamps. Among the advantages of clamped interconnections, there is less need for alignment in particular in compass direction of the flanges. Note that compact flanges traditionally are fixed with bolts, while clamps are independent of compass direction. There are a plurality of advantages with utilizing clamps instead of traditional bolting solution, among others that there is no longer a need for aligned bolt holes, something which in turn solves problems with control of flange positions to achieve alignment with holes in adjacent flange, and also that the clamp solution provides greater possibility/flexibility to align any misalignments between the flanges.

In order to—among others—be able to use a safer double sealing ring solution instead of the more commonplace single sealing ring solution, it is necessary to modify the geometry of current compact flanges.

Another objective is to design connector parts which passively center in case of considerable direction deviation when the axial ends of the connector parts are guided towards each other in the same or similar manner as described in Norwegian patent application no. 20110784. Furthermore, the clamping device is shaped such that it will contribute to active connecting/pressing of the axial ends of the connector parts even in situations with considerable external resistance from for example associated pipelines.

Another objective is that it should be easily possible to verify if the right pre-tensioning is obtained between the axial ends of the connector parts.

The present invention will now be described in detail with support from the corresponding figures.

One embodiment of the present invention is illustrated in FIG. 1A-C, where the tube connector 1 comprising lower and upper connector parts 2, 3 (see also FIG. 2A) is shown mounted in fluid communication on lower and upper pipelines 4, 5 respectively. For easier understanding, the clamping device is not shown. Said guiding device 8-12 is illustrated as a two-part telescopic guiding system mounted on said lower and upper connector parts 2, 3 respectively. Note that the terms upper and lower are merely intended for facilitating the understanding of the described embodiments and correspond to first and second respectively in the general description and the corresponding claims. The lower pipeline 4 is typically mounted on a demountable riser buoy connected to a vessel (not shown), and the upper tube coupling end 5 is typically mounted in the STP-room of the vessel (not shown).

Furthermore, the upper connector part 3 comprises two axial upper ends 6, 7, upper axial end 6 and upper tube coupling end 7, which can be coupled to the lower connector part 2 and the upper pipeline 5 respectively. Likewise, the lower connector part 2 comprises two axial lower ends 15, 16, lower axial end 15 and lower tube coupling end 16, which can be coupled to the upper connector part 3 and the lower pipeline 4 respectively. Upper guiding system 8-10 is shown in FIG. 1 assembled of two upper radial arms 8, 8' mounted on and directed radially out from the upper connector part 3, and also two guide housings 9, 9'' connected to the two radial arms 8, 8', where an axially movable guide rod 10, 10' is arranged within each of the guide housings 9, 9'. The lower guiding system 11-12 is further assembled of two lower radial arms 11, 11' mounted on, and directed radially out from, the lower connector part 2, and also two guide sleeves 12, 12' connected to the radial arms 11, 11' and having an inner diameter which is sufficiently large to be able to receive fully or partially the guide rod 10, 10'.

With reference to FIGS. 2A-B, the two axial ends/connector part extensions 6, 15 (hereinafter also referred to as hubs) are associated with each of the two connector parts 2, 3, and which are guided to each other on contact making, produced with a protrusion 17 (indicated by squared pattern in FIG. 2B) in the upper hub 6 and a corresponding recess 18 in the lower hub 15.

The two hubs 6, 15 are shown in FIG. 2A as integrated parts of their respective connector parts 2, 3. Furthermore, the upper 7 and lower 16 tube coupling end is adapted with each its flange which can be coupled to the corresponding pipelines 4, 5. In a preferred embodiment these tube coupling ends 7, 16 are a part of the same casting/forging as the hubs 6, 15. However, it is possible that the tube coupling ends 7, 16 can be designed differently, for example with ordinary tubular geometry having notches for welding of the corresponding pipelines 4, 5.

By joining the connector parts 2, 3, the contact making will happen between the two opposite located upper and lower contact surfaces 70, 71 (see FIG. 2B), and thus forming a common contact area when the connector parts 2, 3 are stabilized/compressed. Each of these contact faces 70, 71 comprise at least one, preferably at least two, non-crossing, circular outer and inner grooves 35, 35', 36, 36' which run in closed loops on the contact surface around the fluid transporting, hollow part 110 of the tube connector 1. Each of the preferably at least two grooves 35, 36 located on the upper contact face 70 has an opposite, mirror-imaged groove 35', 36' located on the lower contact face 71 which on contact making forms outer and inner cavities 60, 61. The contact making itself is stabilized by means of suitable clamping devices 22, 22' (see FIGS. 5 and 6) which clamp the lower and upper connector part 2, 3 to each other by for example bolts 23, 24 in order to achieve a fluid-tight, or substantially fluid-tight, coupling.

The grooves 35, 35', 36, 36' comprise outer 37 and inner (upper and lower) groove walls 38, 39 (FIGS. 2C and 2D), as in the embodiment shown in FIGS. 2 B-D form a tapered or close to tapered shape with respect to the axial axis 100 of the tube connector 1. In the same embodiment, the inner groove wall 38, 39, which faces out from the center axis 100, is formed with two different angles of inclination separated by a rounded break 40 located substantially half-way down into the depth of the groove 35, 35', 36, 36'. A preferred embodiment is shown in FIGS. 2C and 2D, where the upper part 38 of the groove wall 38, 39 which faces out from the center axis 100 of the connector substantially is according to standard grooves for the present sealing rings, which for an IX type seal is parallel or close to parallel with the axial axis 100, while the lower part 39 of the same groove wall 38, 39 inclines more than standard such that the current groove 35, 36 becomes somewhat more spacious (see FIGS. 2C and 2D). This geometry is adapted in order to avoid damage to seal/sealing rings 80, 81 during connecting as described in NO20110784. The benefit of such a specific groove design is that it allows for more space between the outer and the inner sealing ring(s) 80, 81 and the corresponding sealing groove(s) 35, 35', 36, 36' during connecting, something which in turn allows for a certain angular anomaly between the two connector parts 2, 3 during connecting. Correspondingly, the lower portion 124 of the inward bound inclined plane 37 in the upper hub 6 may also be applied a break 124 below the contact point 125 between the sealing ring 80, 81 and the groove surface 37, 38 (see FIG. 2D). Correspondingly, the upper part of the corresponding surface 37' may also on the lower the hub 15 is applied a break 124' located above a corresponding contact point 125'.

Furthermore, the angle on the sealing faces 37, 37', 38, 38' of the grooves is different from standard groove for standard IX sealing rings in that the angle of inclination on the sealing faces 37, 37', 38, 38' is adjusted as a consequence of the angle deformation of the tube connector 1 under pre-tensioning of the clamping device 22, 22'/bolts 23, 24. This is determined by an analysis of the strain as a consequence of joining of the clamping device 22, 22'. Note that the tube connector 1 with the clamping device 22, 22' according to the invention will change form in a different manner than standard flange faces with bolts. The configuration shown on the FIGS. 2A-C utilizes two sealing rings 80, 81 located in each its cavity 60, 61, which together in operation form a double fluid barrier.

Again with reference to FIG. 2A, the tube connector 1 further comprises at least one test channel 90, 91 in the form of an open channel which runs inside one or both of the connector parts 2, 3 and to the interfaces for two center coupling faces 70b, 71b located in the area between the cavities 60, 61 (FIG. 3). At least one 90 of the at least one test channels 90, 91 is configured such that it/they allow for pressure testing by injection of testing gas, preferably one or more inert gases. In FIG. 2A, there are two test channels; first 90 and second 91, shown oriented substantially axially 100 in relation to the tube connector 1, and partly going through the upper connector part 3.

At least one of the coupling surfaces 70a-e associated with the upper connector part 3 is tapered towards the axial cavity 110 of the connector 1. Furthermore, an inner step 120, 120' just outside the (outer) second sealing groove 35, 35', 36, 36' is shown in FIG. 3A-C. In this embodiment, the second outer connection surface 70d extends from the inner step 120 (ref FIG. 3B) to an outer step 123 (FIGS. 3A and B), and further to a third outer connection surface 70e. Alternatively, outer coupling faces 70c, 70d extend to substantially cylindrical and tapered shaped guiding faces 121, 121', 122, 122' located on the upper 6 and lower 15 hub, respectively (see FIG. 2B). The latter guiding faces 121, 121' serve as a control in centralizing the two connector parts 3, 2 as described in Norwegian patent application NO20110784. The outer guiding faces 122, 122' are adapted such that on contact making, prior to pre-tensioning of the clamps 22, a gap a between the coupling surfaces 70, 71 at the periphery of the connector parts 3, 2 is formed.

An extension of the contour line which represents the surfaces 70a and 70d runs preferably via a common point 131 inside at the wall of the tube portion 101. This point is the first contact point 131, too. The inner surfaces 70a, 71a may beneficially be shaped with a slightly higher slope (angle) than the other outer surfaces 70d, 71d, too. The angle of inclination for the surfaces 70d and 71d is adjusted based on calculations of the connector. In principle, the angle of inclination should be from horizontally (axial direction in relation to the connector) slightly smaller than what is needed to achieve contact at pre-tensioning of the clamps 22, 22', such that a defined and high pressure is achieved between the two surfaces along the inner edge towards the pipe 100, and also that there is a considerable pressure between the other, outer surfaces 70d, 71d at pre-tensioning of the clamps 22, 22'. This strong and concentrated pressure in between the surfaces 70, 71 gives a beneficial sealing effect of its own. Note that such an effect is achieved with Norsok CFC sealings, but is absent when using common clamp type connectors. In this way, a stable or close to stable connection between the two connector parts 2, 3 is beneficially achieved in the two defined contact faces (ring-shaped contact faces on the inside and the outside of the possible two sealing rings 80, 81 when the clamping device 22, 22' is mounted.

The middle and the first outer surface 70c are located usually aligned with the inner surface 70a. This is also the case for the corresponding surfaces for the opposing hub. They may however be different. The important aspect is that the middle 70b, 71b and the first outer surfaces 70c, 71c do not come into contact with each other when the connector parts 2, 3 are assembled. This is for not disturbing the defined contact between the two above-mentioned contact faces (ring-shaped contact faces).

The angle of said tapered contact faces 70a, 71a, 70d, 71d is adapted to the stiffness of the flanges, external load and the clamping force of the clamps 22, 22' such that the two surfaces 70, 71 meet and form compression in the contact areas, that is, compression in the inner 70a, 71a and other outer 70d, 71d contact faces at mounted clamps 22, 22'. Further, the clamping force and the pre-tension between the respective contact faces 70, 71 is so high that the compression pressure is maintained when loaded, for example, by stretch in the connector parts 3, 2 by external loads, or from end cap effects from the inner fluid pressure in the hollow tube portion 110 of the connector 1. In this way, statically stable inner and outer ring-shaped, pre-tensioned contact zones are achieved. Thus, it is formed an inner sealing by the inner contact surfaces 70a, 71a against the pipe/pressure chamber 110. Such a sealing would be an addition to the sealing effect by the sealing ring(s) 60, 61. Furthermore, it is achieved an outer sealing zone by abutment of the first outer contact surfaces 70d, 71d which hinder penetration of for example water and impurities from the outside.

In case of an external load on the tube connector 1, for example tensile forces in the connector parts 3, 2, there will be a pressure relief on these two pre-tensioned surfaces 70a against 71a and 70d against 71d. The sealing faces 37-39, 37'-39' will by this obtain insignificant relative motion in relation to the sealing rings 80, 81 on pressurizing or application of external loads on the connector. In flanges and connectors without such pre-tensioned surfaces, stretch and torque loads and internal pressure would cause strain in flanges and clamps 22, 22', which causes the distance in between the contact surfaces 70, 71, and thus as well the sealing faces 37-39, 37'-39', to increase.

As mentioned above, the first outer contact faces 70d, 71d are limited in a beneficial embodiment in radial extent outwards and either transits to recessed third outer contact faces 70e, 71e via a step 123, 123'(see FIG. 3A-C) or to guiding face 121, 121' depicted in FIG. 2B. It may also be extended outwards on the same level. Such a recess at 123, 123' in FIG. 3B or transition to guiding face 121, 121' would delimit the area of the surfaces 70d, 71d and thus beneficially contribute to a more defined abutment in between the contact surfaces 70, 71.

For an 8" high-pressure 10000# (690 bars) pressure class connector, a typical angle on the inner tapered contact faces 70a, 71a is about. 0, 4 degrees in relation to (a surface) axis perpendicular to the center axis 100 of the tube connector 1, and about 0, 25 degrees for the other outer 70d, 71d tapered surfaces. In principle these angles should be about 30-50% less than computed angle deformation, without resistance from the contact faces against the opposing hub, when the clamp arrangement 22, 22' is fully pre-tensioned.

For comparison, corresponding angles for standard (Norsok standard L005) 8" compact flange for 5000# pressure class the angle of inclination for outer surface is about 0, 29 degrees and inner surface(s) about 0, 44 degrees. The standard states angles for these surfaces for standard bolted flanges. They vary by pressure class and dimension.

The coupling surfaces 71a-e in the lower connector part 2 have corresponding design as the upper, that is, with deviation as described above for upper connector part 3. The slope angel of the tapered contact faces 71a, d and the sealing faces 37'-39' is determined here in the same manner by strain computations to obtain the desired contact properties as described concerning the upper connector part 3.

The resulting relative angle between the coupling surfaces 70, 71 in the upper 3 and the lower 2 connector part (indicated as a in FIG. 3) is adapted according to the stiffness of the connector parts 3, 2 (more specifically the hubs 6, 15), and also the compression which is achieved by the clamping device 22, 22'. In case of initial, non-compressed tube connector 1, the angle a is sufficiently large to be able to maintain the contact pressure towards the inside of the clamping device 22, 22' during each step in the pre-tensioning of the clamping device 22, 22' and the load/the compression of the connector 1, but small enough so that contact between the contact faces 70d and 71d is maintained at normal pressure and external loads in operation.

Note, that the angle and the diameter of the sealing groove(s) 60, 61 are given a deviation in relation to a "standard" sealing groove for rigid flanges. These are adapted according to the deformation of the lower connector part 2 similar to the sealing grooves associated with the upper connector part 3 such that diameters and angles for the sealing groove 60, 61 in the deformed tube connector 1 correspond to standard sealing groove for rigid flanges.

FIG. 2A and FIG. 3A also show that outer surface on the upper 6 and lower 15 hub is designed with different face inclinations 75a, 75b, 76a, 76b. Here, the letters a and b refer to upper 6 and lower 15 hub respectively. In relation to the axis perpendicular to the axial axis 100 of the tube connector 1, the inner face inclination 75 has a lower slope than the outer face inclination 76. For example, the angle relatively to the direction perpendicular to the axial axis 100 for the inner face inclination 75 may range 5-25 degrees, while for the outer strain slope, it may be in the range 25-55 degrees. This particular design is adapted to the geometrical design of the clamping device 22, 22' described below.

The angle for the inner face inclinations 75 is adapted to the frictional coefficient in between the surfaces. This means that the resulting angle on the tapered contact faces arising between the outer surfaces of the hubs 6, 15 and the corresponding inner surfaces of the clamp arrangement 22, 22' is so steep that it is easy to release the clamps 22, 22' in connection with separating the connector parts 3, 2.

Furthermore, the angle for the outer face inclinations 76a, 76b is so steep that they cover greatest possible range, but nevertheless not greater than that the clamp arrangement 22, 22' easily slides up along these surfaces during the initial clamping and resulting alignment of the two connector parts 2, 3).

FIGS. 3A-C show the process where the clamping device 22, 22' is guided up over the hubs 6, 15 and which consequently cause a clamping of respective coupling faces 70, 71 of the connector parts 2, 3. Note that the drawings are not in scale. Specifically, the angle deviation such as a and f is exaggerated for clearly showing the principles of the clamping process. The same parts of the hubs 6, 15 shown in FIG. 2B are illustrated in the FIGS. 3A-C. A first guiding device as described in NO20110784 is not shown for increased understanding.

In FIG. 3A, the connector parts 3, 2 are unimpaired or close to unimpaired by the clamping device 22, 22'. A sufficient clearance/aperture exists between the clamping device 22, 22' and the hubs 6, 15. To this state of the pre-tensioning of the connector parts 3, 2, there exists a relative angle f between the inner face inclinations 75a, 75b to the hubs and the upper and lower coupling faces 130a, 130b of the clamping device 22, 22'. This angle is identified in the figure, in addition to the characterizing connection surface deviation a described above. As shown, there is in this situation merely partial contact between the upper and lower inner coupling faces 70a, 71a.

As mentioned above, the purpose of the steeper inclination on the outer (tapered) surfaces 76a, 76b is primarily facilitating inserting/mounting of the clamping device 22, 22' on the hubs 6, 15 of the connector 1. Those portions of the hubs 6, 15 which interact with the clamping device 22, 22' will then add to the initial aligning in addition to the compression of the two connector parts 2, 3 themselves.

FIG. 3B shows a similar situation such as described for FIG. 3A, but where the clamping device 22, 22' is pushed longer up onto the hubs 6, 15 and towards the plane of mirror symmetry of the device 22, 22'. Both the hubs 6, 15 and the clamping device 22, 22' start to change form as a response to the compressions, and the angle deviations f and a mentioned above will consequently be reduced to f' and α', respectively.

FIG. 3C shows the situation where the clamping device 22, 22' is pre-tensioned correctly around the hubs 6, 15. Both the second outer 70d, 71d and the inner 70a, 71a coupling faces are pre-tensioned. At the same time, some level of clearance and/or less pressure between the middle coupling faces 70b, 71b, and also the first outer surfaces 70c, 71c and the third outer surfaces 70e, 71e, is maintained. The clamping force from the clamping device 22, 22' would here be so high that the pressure first of all is maintained between the surfaces 70d, 71d and 70a, 71a even when the two connector parts 2, 3 are exposed for various splitting/destabilizing forces from internal pressure and/or external impacts. The benefit of the particular geometry about the contact making area is that distances between the sealing surfaces 70, 71 are negligible and more "defined"/predictable. Furthermore, also the tensioning variations (e.g. the fatigue stress in the clamping device 22, 22' with associated bolts 23, 24/pre-tensioning mechanisms) becomes smaller.

By combining the disclosed geometry of the clamping device 22, 22', the connector parts 3, 2 and the pre-tensioning mechanism 23, 24, a tube connector 1 is achieved in which the contact between the other outer coupling faces 70d, 71d and the inner coupling faces 70a, 71a are constant or close to constant throughout the entire operational pressure range. In addition, the sealing ring(s) 80, 81 experience no or non-significant relative motion from the connected sealing surfaces 70, 71. In other words, the contact pressure between the sealing faces will be maintained. Thus, leakage is avoided, the sealing ring(s) 80, 81 are not damaged by deformation, and undesired wear on the sealing surfaces does not occur.

Furthermore, FIG. 3 C illustrates that the angle deviation f mentioned above is reduced to close to 0 (f"), that is the inner coupling faces 130 of the clamping device 22, 22' are close to parallel with the inner face inclinations 75a, 75b of the connector parts 3, 2. This gives a beneficially distributed contact pressure between the two coupling surfaces 130, 75.

Standard clamp type connectors have rotationally symmetrical hubs and clamping devices and with inclined contact faces. A common problem for such connectors is that the contact pressure over the circumference of the connector becomes uneven, that is, small close to the pole axis 141 (FIG. 4A) in the clamping device 22, 22' and high in the middle of the strain where the relatively largest height difference between hub and clamping device occurs due to a horizontal displacement of the clamping device towards the plane of mirror symmetry for the two. In a corresponding manner, the pressure increase is small close to the equator axis 140 (FIG. 4A) where the bolts 23, 24 usually are located.

FIG. 4 shows the principles of the geometry of the clamping device 22, 22', where FIG. 4A shows a top view of the clamps 22, 22', and FIGS. 4B and 4C show a cross section of the left side 22' of the clamps in relation to FIG. 4A above the line, respectively marked with B-B (that is in the equator axis 140 of the clamp 22, 22') and A-A (that is close to the polar axis 141 of the clamp 22, 22'((FIG. 4A).

As indicated in FIG. 3A, the existing inclination of the inner contact surfaces 130 on the clamp 22, 22' is somewhat more steep than the inner face inclinations 75 on the hubs 6, 15, seen in relation to the axial axis 100 of the tube connector 1. This distinction in geometry is determined based on the relative deformations of hub 5, 16 and clamping device 22, 22' with the goal that these two contact faces 130, 75 substantially have to be parallel when the clamping device 22, 22 is readily mounted in the correct position. This implies that the pressure distribution between the clamps 22, 22' and the hub 5, 16, along said contact surfaces 130, 75, becomes even during the pre-tensioning, deviation is compensated efficiently, and that the relative movement at pre-tensioning of the clamps 22, 22' is reduced.

Furthermore, solid and dotted lines in FIGS. 4B and C show that the inner contact surfaces 130a', 130b' in cross section A-A on the clamps 22, 22' beneficially are slightly "tighter" (that is lower inclination in relation to radial direction) than the inner contact surfaces 130a, 130b in cross section B-B. This for compensation of differences in the pre-tensioning (which is caused by height changes in case of a displacement of the clamps 22, 22' inwards to the centre) over the circumference of the clamps 22, 22' when it is pressed against its plane of mirror symmetry along the equator axis 140. In this way, a better and a more even pressure between clamp 22, 22' and the hubs 5, 16 is achieved also along the circumference, in that the contact pressure between the clamps 22, 22' and the hubs 5, 16 becomes higher in the pole area 141 than if the contact faces 130a, 130b in the clamping device 22, 22' would have been rotationally symmetrical. This causes a beneficial more even pre-tensioning between contact surfaces 70, 71 of the connector parts 3, 2.

FIG. 5 shows the principles of deformation of the clamps 22, 22' during pre-tensioning. When the clamps 22, 22' are not completely pre-tensioned (FIG. 5A), the first 150, 150' and second 151, 151' clamp flanges will face out from the pole axis 141 to compensate for the deformation when bolts 23, 24 mounted on the clamp flanges (see FIG. 6) are tightened. This is beneficial for the bending torque of the bolts 23, 24 when the contact surfaces of the bolts 23, 24 approach parallel orientation at complete pre-tensioning Note, that the contact surfaces of the bolts 23, 24 here are angled independent of the inner contact faces 152-155, 152'-155' on the clamp 22, 22' in order to ensure that the bolts 23, 24 at any given time have maximum contact with the respective flange faces. However, the inner, essentially co-linear, contact faces 152-155, 152'-155' are angled in such a way that they accomplish essentially the same pressure/tension as when the bolts 23, 24 are pre-tensioned. In FIG. 5A the placement of the middle bolts 24 is indicated by solid lines.

When contact is obtained between the two corresponding inner contact surfaces 153, 153', 154, 154', the gap marked b (see FIG. 5) is closed and a beneficial curvature of the clamps 22, 22' occurs. The clamps 22, 22' are deformed ideally elastically inwards to the centre along the pole axis 141 shown in the figure, and outwards from the centre along the horizontal axis/the equator axis 140 in the figure. Consequently, this will contribute beneficially by an addition to the clamping force in the contact faces by for example cut A-A shown on FIG. 4A, that is between the inner contact face 130 of the clamping device 22, 22' and corresponding inner face inclination of 75 on the hubs 5, 16, and also a minor relief of the pressure in the corresponding surfaces at cut B-B shown on FIG. 4 A. The collective contribution by these two last effects makes it possible to provide a high pressure between hubs 5, 16 and clamping device 22, 22' along the entire circumference of the hubs 5, 16, also in the vicinity of the poles 141. This is important in order to keep pressure between the inner contact faces 70a, 71a, as well as the outer contact faces 70d, 71d, along the entire circumference in case of pressurized and loaded tube connector 1.

As an additional contribution to a preferred embodiment, attention is drawn to FIG. 6 where a third bolt 24 on the clamping device 22, 22' of the tube connector 1 is illustrated. Further with reference to FIG. 5B, this bolt 24, which also is shown on FIG. 5A, will beneficially contribute to that the clamps 22; 22' then bend due to the bending torque which is set up by the cantilever effect from this force. This also results into beneficial radial displacements of the clamps 22, 22' towards centre in the equator area, and out from centre along the equator axis 140 or the horizontal axis on FIG. 5B. The remaining outer bolts 23 are located close to the reference circle for the contact faces between hub 6, 15 and clamping device 22, 22' and thus is effective for the clamping force there between.

When such bolts 23, 24 are used for pre-tensioning of a tube connector 1, correct pre-tensioning of the pressure in the contact faces 70, 71 will normally depend on both measuring precision of the bolt pre-tensioning tool and assumption of which frictional coefficient that exists in several surfaces, for example between nut and bolt 23, 24, between inner hub faces 75 and clamping faces 130, and furthermore on clamp and frictional effects from sealing ring(s) 80, 81 against sealing groove 35, 36. Since determination of friction is uncertain today, and may vary over time and circumstance, there will normally be great uncertainty with respect to which pre-tensioning (contact pressure) that is obtainable for a measured pre-tensioning of the bolts 23, 24. With a particular shape of the clamps 22, 22' as illustrated in FIG. 5A, and which is adapted to the relevant tube connector 1 by thorough calculations prior to manufacturing, the user would quickly learn by observation on site whether the contact faces 70, 71 between the connector parts 3, 2 have correct pre-tensioning by detecting contact between the inner contact faces 153, 153', 154, 154' of the clamps 22, 22'. This is clearly illustrated on FIG. 5B where these surfaces are shown with mutual contact. The implementation allows nevertheless beneficial use of both torque tools and tension tools for pre-tensioning the bolts 23, 24.

In more detail, the distance between the inner and outer contact surfaces 152-155, 152'-155' and the pole axis 141 when the clamp 22, 22' is not pre-tensioned is determined such that when the inner and outer contact surfaces 152-155, 152'-155' on each of the clamp parts 22, 22' make contact, a pre-tensioning between the connector parts 3, 2 is achieved which is sufficient to maintain pressure between the inner contact faces 70a, 71a and between the other outer contact faces 70d, 71d when the tube connector 1 is pressurized and is affected by external loads. The criterion that these surfaces 152-155, 152'-155' must be in contact means better control of correct pre-tensioning of the tube connector 1.

The collective effect of these features is that a good and controlled pre-tensioning of the contact surfaces 70, 71 of the connector parts 3, 2 is achieved throughout or close to the entire circumference of the sealing area.

FIG. 6 shows the tube connector 1 with centre alignment equipment 8-12 as is explained in Norwegian patent application NO20110784. It has 6 main bolts 23, 24 for pre-tensioning of the two hubs 6, 15 towards each other. These bolts 23, 24 may be replaced by other tensioning tools such as for instance hydraulic tools or other suitable tension tools. The middle of the three bolts 24 on each side of the plane of mirror symmetry is beneficially longer than the two remaining bolts 23, and is used for clamping of the two parts of the clamping device 22, 22' towards each other in early stage of interconnecting.

REFERENCE NUMERALS

1: (hollow) tube connector
2: lower/first connector part
3: upper/second connector part
4: lower pipeline/pipeline located on an STP-buoy
5: upper pipeline/pipeline on a vessel
6: upper/second axial end/connector part extension/hub (facing lower connector part 2)
7: upper tube coupling end/axial end of first connector part (facing upper pipeline 5)
8, 8': upper radial arms
9, 9': guide housings
10,10': guiding rods
11, 11': lower radial arms
12, 12': guiding sleeves
15: lower/first axial end/connector portion extension/hub (facing upper connector part 3)
16: lower tube coupling end (facing lower pipeline 4)
17: protrusion (in upper hub 6)
18: recess (in lower hub 15)
22, 22': clamping device/-arrangement (two-part), clamps,
23: outer bolt
24: middle bolt
35, 35': outer (sealing) groove, first non-crossing groove (on upper hub 6)
36, 36': inner (sealing) groove, second non-crossing groove (on lower hub 15)
37, 37': outer groove wall/sealing face (in essence facing towards hollow tube portion 110)
38, 38': upper, inner groove wall/sealing face (in essence turned away from hollow tube portion 110)
39, 39': lower, inner groove wall/sealing face (in essence turned away from hollow tube portion 110)
40, 40': rounded break located between inner upper and lower groove walls 38, 39/38', 39'
60: outer (sealing) cavity
61: inner (sealing) cavity
70: upper (first) connection surface (on upper hub 6)

70a: inner, connection surface
70b: middle connection surface
70c: first outer contact/connection face
70d: second outer contact/connection face
70e: third outer contact/connection face
71: lower (second) contact/connection face (on lower hub 15)
71a: inner, contact/connection face
71b: middle contact/connection face
71c: first outer contact/connection face
71d: other outer contact/connection face
71e: third outer contact/connection face
75: inner face inclination/hub face (on outer face of hub 6, 15)
75a: inner face inclination/hub face (on outer face of upper hub 6)
75b: inner face inclination/hub face (on outer face of lower hub 15)
76: outer face inclination/hub face (on outer face of hub 6, 15)
76a: outer face inclination/hub face (on outer face of upper hub 6)
76b: outer face inclination/hub face (on outer face of lower hub 15)
80: outer seal/sealing rings
81: inner seal/sealing ring
90: first test channel
91: second test channel
100: axial axis
110: hollow tube portion, pressure chamber
120, 120': inner step
121, 121': substantially cylindrical shaped inner guiding face, axially directed surface
122, 122': substantially tapered outer guiding face
123, 123': outer step
124, 124': break on inward oriented inclined surface 37, 37'
130, 130': inner connection/contact face/non-rotationally-symmetrical inclined surface in clamping device 22, 22'
130a, 130a': inner connection/contact face in upper part of the clamping device 22, 22'
130b, 130b' inner connection/contact face in lower part of clamping device 22, 22'
131: first contact point between upper and lower hub, innermost towards the pipe 110
140: equator axis (axis in parallel with radial plane of the clamping device 22, 22' and perpendicularly to axis through the contact faces of the clamping device 22, 22')
141: pole axis (axis in parallel with radial plane of the clamping device 22, 22' and in parallel with axis through the contact surfaces of the clamping device 22, 22')
150, 150': first (clamp-) flange (upper part on FIG. 5A)
151, 151': second (clamp-) flange (lower part on FIG. 5A)
152, 152': outer contact face on clamp flange (lower part on FIG. 5A)
153, 153': inner contact face on clamp flange (lower part on FIG. 5A)
154, 154': inner contact face on clamp flange (upper part on FIG. 5A)
155, 155': outer contact face on clamp flange (upper part on FIG. 5A)

The invention claimed is:

1. A hollow tube connector for detachable connecting of two connector parts comprising:
a first connector part wherein a first of first and second axial ends of the first connector part is configured to connect to at least one pipeline on a vessel,
a second connector part wherein a first of first and second axial ends of the second connector part is configured to connect to at least one pipeline located on a submerged turret production-buoy,
a clamping device which entirely or partially encloses the second axial ends of the first and second connector parts such that the first and second connector parts are clamped together to form a fluid-tight connection for a hollow tube,
wherein contact surfaces of the second axial ends of the first and second connector parts comprise inner contact surfaces and at least two non-crossing grooves having a middle contact surface between the at least two non-crossing grooves, and a first outer contact surface outside the at least two non-crossing grooves and extending circumferentially around the contact surfaces, the at least two non-crossing grooves located on one of the contact surfaces each having a mirror-imaged groove located on the opposite contact surface providing two pairs of opposite non-crossing groves such that the two pairs of opposite non-crossing grooves and mirror-imaged grooves form at least two encompassing cavities upon contact of the contact surfaces and each including at least one sealing ring configured to be positioned in one or more of the at least two non-crossing grooves and the at least one mirror-imaged grooves prior to sealing connection between the first and second connector parts upon contact of the contact surfaces;
the inner contact surfaces tapering inwardly towards an inner first point of contact between the first connector part and the second connector part, wherein the middle contact surface and the first outer contact surface do not contact each other when the clamping device is tensioned, thus forming an inner pre-tensioned, ring-shaped and abutting contact zone and an outer pre-tensioned, ring-shaped and abutting contact zone inside and outside of the at least two sealing rings respectively, making a fluid-tight connection of the first and second connector parts resistant against internal pressure and strain.

2. The hollow tube connector according to claim 1, further comprising at least one test channel as an open channel with a first end located in an interface between the two contact surfaces between the at least two encompassing cavities, and a second end located on an outer surface of the hollow tube connector.

3. The hollow tube connector according to claim 2, wherein the at least one test channel is configured to allow injection of at least one test medium for pressure testing.

4. The hollow tube connector according to claim 1, including at least one of an outer groove wall and an inner groove wall, each outer groove wall and inner groove wall being associated with one groove of the at least one groove which faces inwards to and out from the center axis of the hollow tube connector respectively, and having an orientation which differs from an axial orientation with respect to the center axis of the hollow tube connector.

5. The hollow tube connector according to claim 4, wherein the inner groove wall of at least one of the grooves which faces out from the center axis of the hollow tube connector has a part at an angle closest the contact surface which differs more than the angle of a remaining part of the groove wall in relation to the center axis of the hollow tube connector.

6. The hollow tube connector according to claim 1, wherein the first and second connector parts further comprise outer contact surfaces comprising mating substantially cylindrical and tapered guiding faces on the upper and lower hub respectively, to ease centration.

\* \* \* \* \*